April 18, 1944.   A. N. CONNELLEE ET AL   2,347,083
APPARATUS AND METHOD FOR MARBLEIZING COMESTIBLES OR THE LIKE
Filed Sept. 8, 1941   2 Sheets-Sheet 2
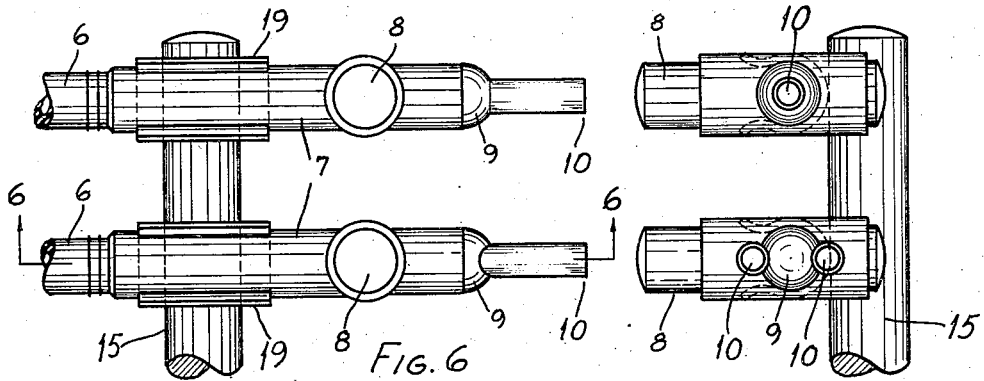
Fig. 6
Fig. 7
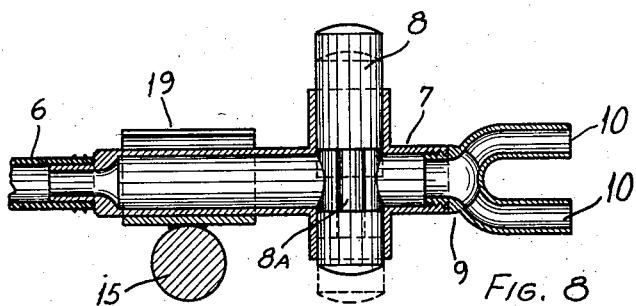
Fig. 8
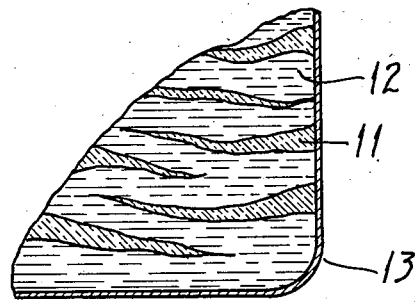
Fig. 9
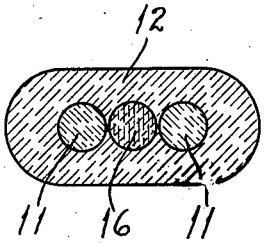
Fig. 11
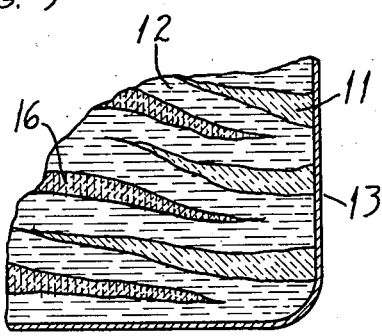
Fig. 10
INVENTORS
ANITA N. CONNELLEE
LINWOOD CONNELLEE
By
*[signature]*
THEIR AGENT Patented Apr. 18, 1944

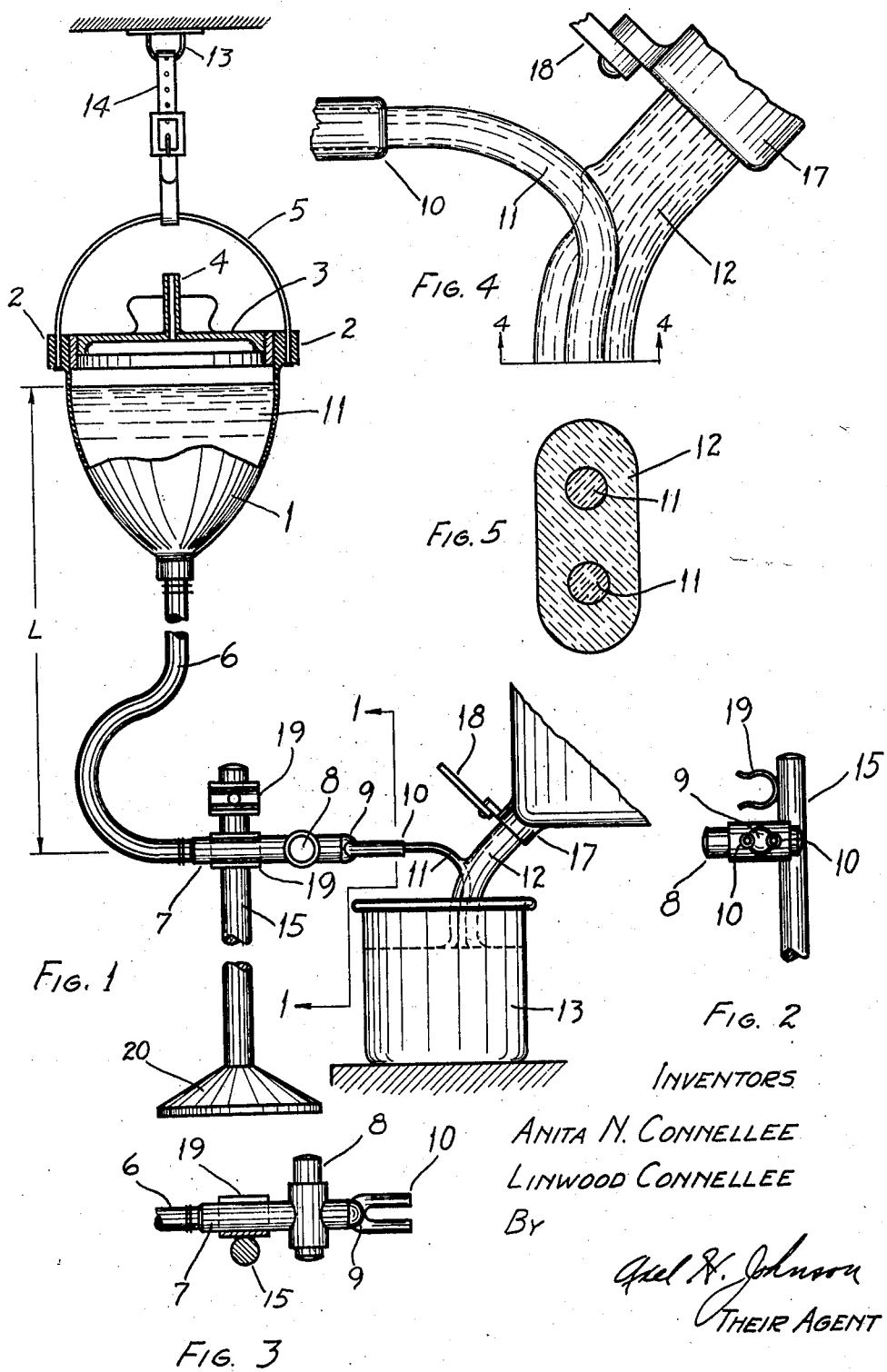

2,347,083

UNITED STATES PATENT OFFICE 2,347,083

APPARATUS AND METHOD FOR MARBLE-IZING COMESTIBLES OR THE LIKE

Anita N. Connellee and Linwood Connellee, Ottawa, Ill.

Application September 8, 1941, Serial No. 409,988

5 Claims. (Cl. 107—54)

This invention relates to an apparatus and method for introducing syrups and the like into a product while in a semi-solid state, and results in a marble-like effect with contrasting strata uniformly dispersed throughout the mass.

This invention is primarily intended for use in marbleizing ice cream, which, when treated in this manner is very tasty and popular, and is called Twirl, Ripple or Marble ice cream, sherbet or ice.

When producing a twirl, ripple or marble effect in ice cream, the method consists in allowing a jet of syrup flavoring or the like to impinge a stream of semi-frozen ice cream as the latter issues from the freezer or dispenser. On combining, the resultant stream settles into a storage container or carton. The container or carton is immediately transferred to a freezing compartment to solidify the ice cream to prevent intermixing of the dispersed strata with the ice cream. Intermixing of the ice cream and syrup strata would destroy the effect by destroying the definite line of separation. If properly done, and frozen, the ice cream has an appearance of marble, contrasting strata of syrup or the like being dispersed at random throughout the mass. Uniformity of stratification is partly controlled by the manner in which the resultant stream "folds" or settles into the container. Ice cream, when treated in this manner provides a product that can be made at the freezer in bulk, or can be packed directly into cartons for sale to the consumer. This product, when served as a sundae, for instance, needs no other treatment, the syrup melting first owing to the lower freezing point of the syrup, which flows out over the ice cream imparting a very pleasing effect. Therefore, it is not necessary to add syrups to the sundae when serving.

It is essential that the ratio of the syrup to the ice cream or other comestible product be constant as to quantity, because the operator has no other reasonable means of knowing the result obtained. It is possible to hand paddle the batch of ice cream if the desired effect has not been obtained, but such mixing is haphazard and likely to spoil the distinct line of separation between syrup and ice cream. Obviously, such mixing cannot be resorted to when filling cartons as they may be damaged, being made of paper. Lacking a constant ratio of syrup to comestible results in a product which either has too little syrup to get the proper effect, or too much. In the latter case there is usually a waste of syrup in addition to a failure to obtain the desired effect, and also resulting in the syrup forming in pools at random throughout the mass of comestible. The most likely cause of the forming of these pools is that there is not sufficient pressure behind the syrup to compel it to penetrate the stream of comestible or ice cream, as the product issues from the freezer or dispenser. Consequently the syrup flows substantially tangent to the stream of comestible without penetrating it. The result is a mass of ice cream or other comestible with a pool of syrup as a top layer.

When the method has been properly carried out as is done with this invention, the syrup is impinged against the ice cream or other comestible as the product issues from the freezer, with pressure just sufficient to penetrate the comestible stream to the approximate center thereof. After this takes place the comestible stream envelopes the syrup jet, as shown in Figures 4 and 5, and the combined stream then settles into the container or carton. The apparatuses obtainable at the present time to produce this product are unsatisfactory for several reasons. They do not assure the operator that he is getting the desired effect; are wasteful of syrup, and require the operator to hold the apparatus at the proper position so as to impinge the comestible. This prevents the operator from doing other tasks while the syrup is being introduced into the ice cream or comestible, and also prevents introducing more than one syrup simultaneously.

The typical device now obtainable has the appearance of a liquid measure. The lip of this receptacle has one or more orifices or small tubes through which, when the device is tilted, the syrup flows. It is necessary to hold this receptacle by hand to facilitate the control of the flow of syrup, and to be sure that it impinges the stream of ice cream or comestible as the latter flows from the freezer or dispenser. The present invention is intended to remedy the above faults, with a consequent improvement in the product.

The chief objection to the above apparatuses is the lack of sufficient and uniform pressure to force the syrup jet into the comestible stream. As a consequence of the lack of pressure there is a waste of syrup when the latter forms the pools before mentioned.

The object of this invention is to first provide a device which may be secured to the freezer or dispenser or arranged to stand on the floor, so as to free the hands of the operator for other duties.

Another object is to obtain a sufficient and uniform orifice pressure so as to assure penetration of the comestible stream by the syrup jet. The result of uniform regulation of syrup pressure and quantity is a "metering" process which avoids waste of syrup.

Another object of this invention is to provide an apparatus which will allow the introducing of more than one kind of syrup simultaneously, which is not reasonably possible with the apparatuses available at the present time.

Referring to the drawings:

Figure 1 is a view of the apparatus in operation, introducing one syrup into a comestible.

Figure 2 is a view at section 1—1 of Figure 1.

Figure 3 is a plan view of the nozzle head.

Figure 4 is a section through a stream of comestible as it flows from the dispenser, and has enveloped the jet of syrup.

Figure 5 is a view through section 4—4 of Figure 4.

Figure 6 shows two nozzle heads combined on the bracket so that two syrups may be introduced simultaneously.

Figure 7 is a front view of the two nozzle heads shown in Figure 6.

Figure 8 is a section taken through 6—6 of Figure 6, and shows the sliding valve 8 with its constriction 8A.

Figure 9 is a section through a storage container showing the effect obtained when introducing one syrup into a comestible.

Figure 10 is a section through a storage container showing the effect obtained when introducing two syrups simultaneously into a comestible.

Figure 11 is a section through the stream of comestible with two syrups introduced, and after the comestible stream has enveloped the syrup jets and is settling into the container.

Referring to the drawings, we will proceed to describe our invention, numbers corresponding to like numbers in the following description:

Receptacle 1 contains the flavoring syrup or the like which it is desired to introduce into the comestible. This receptacle 1 may be of rubber or similar material, and is provided with lugs 2 and bail 5 by which the receptacle 1 may be hung at the proper height to provide adequate gravity pressure at the orifices 10. A hook 13 is located at a convenient height and a suspension means 14 is provided by which the apparatus may be hung, so that the gravity pressure may be varied merely by adjusting the height of the receptacle relative to the orifices 10. This height is designated L in Figure 1, and is called the "head," and which is the vertical distance from the syrup surface in receptacle 1 to the center of the orifices 10. The above mentioned adjustment is especially useful when introducing a plurality of syrups of various densities, because density variation directly affects the amount of penetration of syrup into the comestible. Therefore it is necessary to regulate the pressure to compensate for this variation, which is done by adjusting the elevation of the receptacles. This adjustment is made so that the syrups issue from the various orifices with uniform penetrating force.

Cover 3 is preferably threaded into receptacle 1 or any other construction may be adopted which will assure a good fit so that supplemental pressure may be applied to vent 4 if gravity pressure is inadequate. If gravity pressure is adequate vent 4 is kept open to allow free flow of syrup to orifices 10, by gravity.

Rubber tubing or the like, 6, conveys the syrup to the nozzle head 7. Nozzle head 7 is secured to tubing 6 by any convenient means such as a hose clamp or wire. A similar clamping means may be used to secure the tubing 6 to the lower portion of receptacle 1.

Flow-control valve 8 is in the form of a sliding valve and is intended to regulate the quantity or interrupt the flow of syrup through orifice head 9 and orifices 10. Valve 8 is cylindrical in shape and has a constriction 8A, to allow the passage of syrups through nozzle head 7 to the orifices 10. To regulate the quantity of flow through the orifices 10, it is only necessary to slide the valve 8 axially, which decreases the exposed constriction and decreases the flow of the syrup. When the constriction is entirely without the chamber or passage through nozzle head 7, the passage through the latter is entirely closed, and flow is interrupted. This valve is an improvement over other forms in that it can be removed easily for cleaning. It is shown partly closed, by dotted lines.

The forward end of nozzle head 7 has threaded into it, orifice head 9. This orifice head 9 may be made with one or more orifices 10, and which orifices may be of various diameters to suit the densities of the syrups to be used. These orifice heads may be changed at will by unscrewing from the nozzle heads 7.

Heads 9 with large orifices may be used with heavy syrup and heads with small orifices may be used for syrups of less density. They may be also made with a plurality of orifices for various effects.

Figure 1 shows the apparatus mounted before an ice cream freezer and in operation. Bracket 15 supports nozzle heads 7 in spring clips 19 in the proper position. These clips allow for quick changing of syrups. Bracket 15 has a base 20 which allows the bracket to stand on the floor, so as to be adaptable to a variety of freezers. This bracket may have provision for as many nozzle heads as convenient. Discharge 17 and freezer gate 18 are those of the conventional freezer. Paper cartons may be substituted for container 13 at will.

As mentioned above, bracket 15 is arranged to receive two or more nozzle heads 7, so that a plurality of syrups may be introduced simultaneously into a comestible. As shown in Figure 6, one can be provided with a double orifice while another can have a single orifice. When a "Double twirl" is being produced, which is made with two syrups, the nozzle heads are mounted as shown in Figures 6 and 7, with a single orifice head above the double head. When the syrup flows from these orifices that from the single orifice flows intermediate that from the double orifices. The result is very pleasing and is an important part of this invention.

The cycle of operation when making a Twirl ice cream is as follows:

Valve 8 is closed and receptacle 1 is filled with the desired syrup. Cover 3 is secured in place and the receptacle 1 is hung by hook 13 with strap 14. If gravity pressure is sufficient, distance L should be adjusted to provide the proper pressure at the orifices 10, and vent 4 should be left open. Pressure adjustment should be such as to compel the syrup jet to penetrate the ice cream stream as it issues from the freezer, and so that the said ice cream stream can envelope the syrup jets. However, if gravity pressure is not adequate, a source of pressure must be connected to vent 4 to supplement gravity pressure. The nozzle head 7 is then placed into spring clip 19 and adjusted to allow syrup jet 11 to impinge ice cream stream 12. Valve 8 is then opened to allow the proper proportion of syrup 11 to flow against the ice cream stream 12.

When introducing two syrups into ice cream the additional syrup 16 flows from a single orifice 10 intermediate a double orifice from which syrup 11 flows. The procedure is the same as for single-syrup Twirls.

To assure the "metering" of the proportions as mentioned before, it is necessary that the velocities of the syrup jet and the ice cream stream flow equally at the point of convergence. Then, on settling into the container, the mass is correspondingly uniform. When the ice cream has settled into the container it must be immediately transferred to a freezing compartment to "fix" the strata against settling of the syrup to the bottom of the container and, as before mentioned, to prevent destroying the definite border between syrup and ice cream.

While the invention as here described is primarily for use in connection with ice cream, it is not the intention of the inventors to limit it thereto, but claim all reasonable equivalents thereto, which this invention embraces.

What we claim as new, and desire to secure by Letters Patent of the United States is:

1. A method of marbleizing ice cream or the like, consisting of impinging a plurality of jets of contrasting syrups against a stream of semi-frozen ice cream as the latter issues from a freezer, one of said syrups issuing as a plurality of jets, and a contrasting syrup issuing as a single jet and directed intermediate the said plurality of jets, the velocity of said jets and said stream being substantially constant, the pressure of said jets being sufficient to cause penetration of said stream approximately to the core thereof, said stream thereupon enveloping the syrup jets, the combined stream stratifying or folding into a substantially-level mass in a container and said container placed in a freezing compartment for quick freezing of the ice cream.

2. An apparatus for forcing a jet of syrup into a stream of a semi-liquid product by impingement, comprising a nozzle head in impingement position adjacent said stream, means integral with said nozzle head to meter the quantity of syrup passing therethru, a support for said nozzle head adapted to permit lateral adjustment thereof, a syrup receptacle disposed at a sufficient altitude to provide gravity pressure, a vented cover for said receptacle, height-regulating means supporting said receptacle and means to convey syrup from the lower extremity of said receptacle to the said nozzle head.

3. An apparatus for forcing a minor jet of syrup into a contrasting major stream of a syrup by impingement, comprising a minor-jet nozzle head disposed in impingement-position adjacent said major stream, means integral with said nozzle head to meter the quantity of syrup passing therethru, a support for said nozzle head adapted to permit lateral adjustment thereof, a syrup receptacle disposed at a sufficient altitude to provide gravity pressure, a cover for said receptacle, means integral with said cover to apply auxiliary pressure when needed, height regulating means supporting the said receptacle and means to convey syrup from the lower extremity of said receptacle to the said minor-jet nozzle head.

4. An apparatus for interfolding a plurality of contrasting syrups into a stream of a semi-liquid product by tangential impingement, comprising a syrup nozzle head having one orifice, a syrup nozzle head having a plurality of orifices and rotatable about the axis thereof, a support for said nozzle heads having a plurality of nozzle-holding clips, and adapted to permit lateral adjustment of said nozzle heads, the said nozzle heads being so disposed that the jet of syrup from the single-orifice head is directed intermediate the jets of the plural-orifice head, said nozzle heads so disposed as to impinge said stream of semi-liquid product tangentially, means to regulate the relative quantity of syrup flowing from each nozzle head, a plurality of syrup receptacles disposed at variable altitudes to provide gravity pressure, height regulating means supporting the said receptacles and means to convey the said syrups from the said receptacles to the said nozzle heads.

5. A method of interfolding a plurality of contrasting syrups or coloring substances into a stream of a semi-liquid product, comprising impinging a single jet of syrup against the said stream, impinging a plurality of jets of contrasting syrup against said stream, the said single jet being directed intermediate the said plurality of jets, the said impinged jets penetrating the said stream and being surrounded thereby, the said contrasting jets and enveloping stream flowing parallel to each other and settling into a storage container, and then being solidified by freezing.

ANITA N. CONNELLEE.
LINWOOD CONNELLEE.